Figure 1:
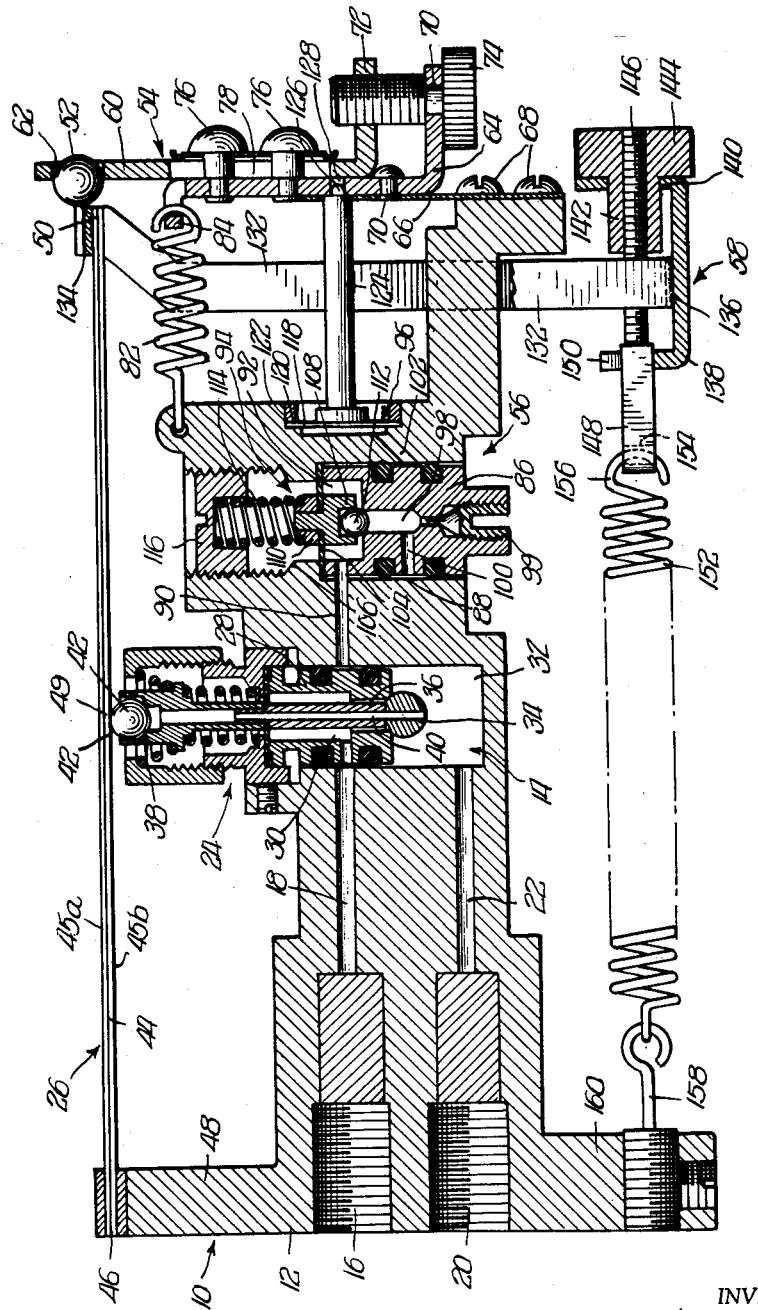

INVENTOR.
Robert J. Norman,
BY
Byron, Hume, Groen + Clement.
attys.

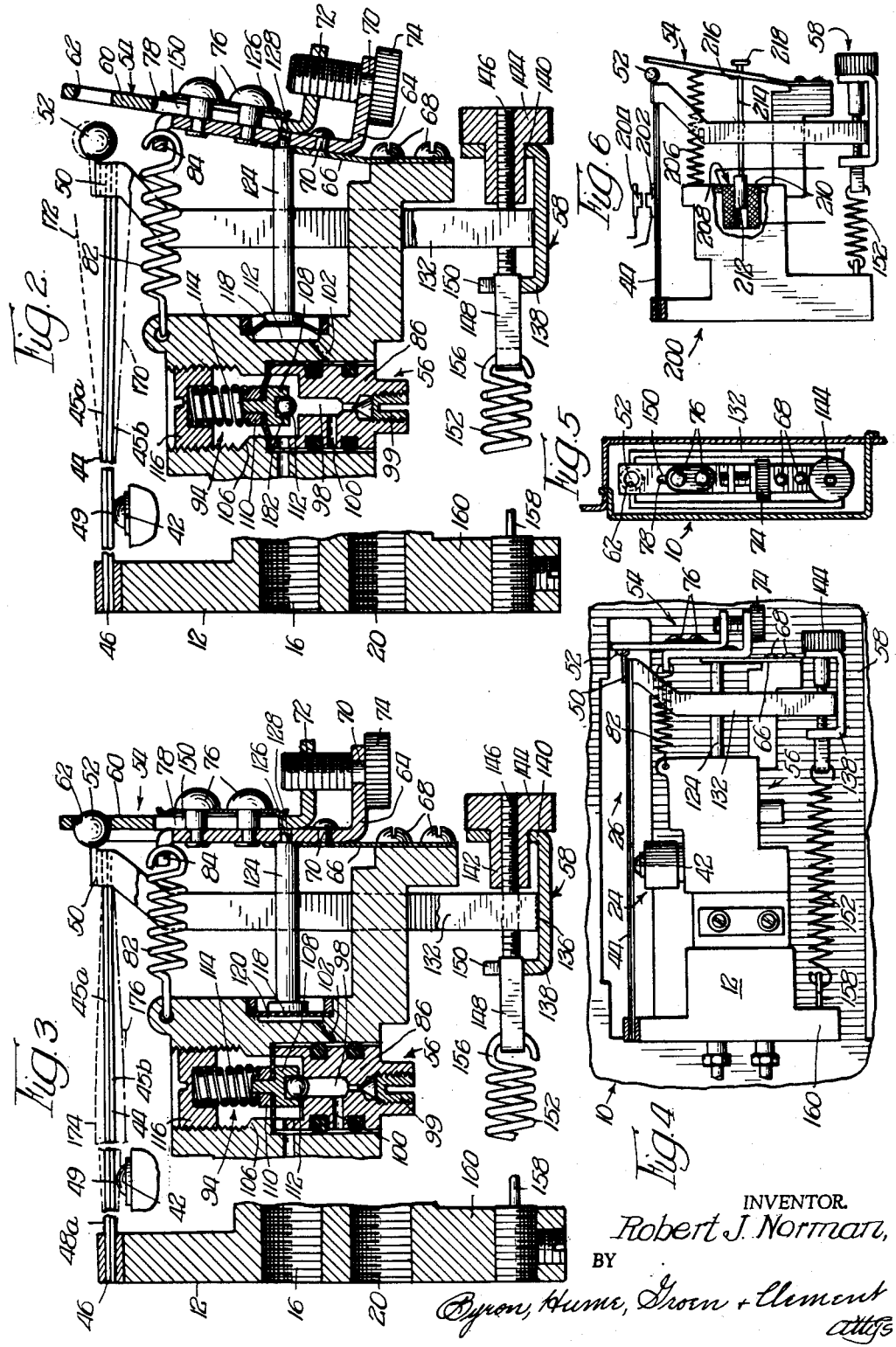

United States Patent Office 3,181,788
Patented May 4, 1965

3,181,788
TEMPERATURE SENSING DEVICE
Robert J. Norman, Chicago, Ill., assignor to The Powers Regulator Company, Skokie, Ill., a corporation of Illinois
Filed June 26, 1962, Ser. No. 201,443
22 Claims. (Cl. 236—1)

This invention relates to a temperature sensing device and in particular to a temperature sensing device composed of a temperature sensitive bimetallic element which may be selectively used for selectively generating a signal either directly or indirectly proportional to variations in temperature and the method for doing the same.

Temperature sensitive bimetallic elements are commonly used in the operation of air conditioning systems for the sensing of variations of temperature from a predetermined temperature level. The bimetallic element is adapted to generate a signal in proportion to the sensed temperature variation and in turn impart the signal on a relay or control device which is used in controlling the air conditioning or heat exchange medium. In those systems in which the air conditioning system may be selectively used for both heating of the ambient atmosphere and cooling of the same, it is necessary that, in the first instance, the element operate in a manner opposite to that required in the second instance, if the same relay or control device is used in both instances. For example, if a system is operating to heat the ambient atmosphere, the bimetallic element, upon sensing an increase in temperature, may move in such a direction so as to diminish the supply of the heating fluid to the heat exchanger. On the other hand, if the system is operating to cool the ambient atmosphere, the bimetallic element, upon sensing an increase in temperature, must provide a signal opposite to that required for the heating operation so that the cooling fluid will be increased. Heretofore, it has been the practice, upon the conversion of a system from a heating operation to a cooling operation and vice versa, that either the bimetallic element be changed at the time of the switchover, or else that the system utilize two control valves, only one of which being operative at any particular type of operation. It is apparent that both of these approaches results in a rather complex construction and/or increased maintenance at the time of the change-over.

The subject invention obviates the limitations of the prior art devices and practices. The subject invention, in essence, provides a method and apparatus in which a single bimetallic blade may be selectively and automatically used for generating both direct and reverse acting signals in accordance with the particular phase of operation of the system at any given time. Specifically, the bimetallic blade is adapted to generate a signal when the system is used for heating purposes that will diminish the supply of heat exchange fluid upon sensing an increase in temperature, or conversely increase the supply of heat exchange fluid upon sensing a decrease in temperature. When the system is used for cooling purposes, the same bimetallic blade is adapted to generate a signal which will increase the supply of heat exchange or cooling medium upon sensing an increase in temperature, or decrease the same upon sensing a decrease in temperature. Thus, the bimetallic sensing device is double acting in that it can generate both direct and reverse acting signals.

The invention may be briefly described as including a bimetallic blade which is permanently fixed at one end in cantilever fashion so that a point intermediate its end is adapted to move with respect to the fixed end in accordance with the temperature. In this manner, the intermediate point, which is the point of contact with the relay for driving the same, moves in a predetermined direction upon sensing an increase in temperature, and moves in the opposite direction a predetermined amount upon sensing a decrease in temperature. The invention also includes a means for selectively supporting, so as to fix, the other end of the bimetal. When the means engages the bimetal, the intermediate point, as will be seen hereinafter, moves oppositely upon sensing increases and decreases in the temperature level, as when such means is disengaged from the bimetal. In other words, the movement of the intermediate point with respect to the permanently fixed end is just the opposite when fixed at one end as when fixed at both ends for the same temperature variation.

The invention further includes a unique means imparting a preload or moment on the bimetallic element in order to establish an equilibrium temperature for the system is which the temperature sensing device is used. Another element of the invention is a means for selectively and automatically driving the support means in and out of engagement with the second end of the bimetal.

While the invention has been described with reference to the ends of the bimetallic element or blade, it is to be understood that this is merely by way of example. As a matter of fact, any two supporting means at spaced points along a bimetallic element may be used in the construction of the invention in that it is not necessary to limit the support to the ends of the blade.

In view of the foregoing, it is the foremost object of the invention to provide a bimetallic temperature sensing device which is double acting in that it selectively provides both direct and reverse acting signals for a given temperature variation.

A still further object of the invention resides in the provision of a bimetallic temperature sensing device which may be selectively and automatically converted from direct acting to reverse acting.

A still further object of the invention resides in the provision of a bimetallic temperature sensing device which is especially adapted to be utilized in air conditioning systems and in conjunction with pneumatic controls therefor.

A still further object of the invention resides in the provision of a bimetallic temperature sensing device in which the pressure used in the operation of a pneumatic control system may also be utilized in the automatic conversion of the bimetallic temperature sensing device from direct acting to reverse acting and vice versa.

A still further object of the invention resides in the provision of a bimetallic temperature sensing device which eliminates the necessity of utilizing a plurality of relays in air conditioning systems which selectively provide both heating and cooling the ambient atmosphere and which are adapted to cooperate with a single relay for both types of operation of the system.

These and other objects of the invention will be apparent upon the reading of the specification with reference to the following drawings:

In the drawings:

FIGURE 1 is a sectional view of a relay assembly including the bimetallic temperature sensing device embodying the invention as adapted for use in a pneumatic control system.

FIGURES 2 and 3 are fragmentary views in section showing both reverse and direct acting stages of the invention, respectively, FIGURE 4 is a plan view in elevation of the relay assembly including the temperature sensing device embodying the invention, FIGURE 5 is an end view in elevation of the relay assembly as adapted for use or mounting in an air conditioning unit; and FIGURE 6 is an elevational view of a modification of the invention.

It will be apparent that the various components of the subject invention may be constructed of any suitable material that will permit them to perform in the manner intended. A great many of the elements may be advantageously constructed of metal, although other materials may be used where suitable. The sealing members, diaphragm, and the like, may be constructed of any material suitable for the particular purpose, such as rubber, plastic, and the like.

For purposes of convenience, the bimetallic temperature sensing device embodying the invention will be described in conjunction with an air conditioning system, and a pneumatic control unit therefor. This is merely by way of example, and in no manner to be construed as a limitation, since it will be apparent that the invention may be utilized in many environments in addition to an air conditioning system.

To permit a clear understanding of the invention and its method of operation, a brief description will be made of one relay assembly in which it is used. However, for a more complete description, reference is made to a copending application filed in the name of Robert J. Norman and Wesley L. Taylor, which is assigned to the same assignee and filed on June 11, 1962 and having Serial No. 201,600.

The relay assembly is generally denoted by the numeral 10 and includes the housing 12. The housing 12 is provided with a bore or chamber 14 which is connected to a source of supply pressure (not shown) by means of the port 16 and the passage 18. The chamber 14 communicates with a pressure-actuated control device such as a motor valve (not shown) by means of the control pressure port 20 and passage 22. A relay device generally denoted by the numeral 24 is mounted within the chamber 14 for the generation of pressure signals in accordance with variations in temperature sensed by the temperature sensing device generally denoted by the numeral 26.

The relay 24 includes a valve body 28 which in essence divides the chamber 14 into a supply pressure compartment 30 and a control pressure compartment 32. The flow from the supply pressure compartment 30 to the control pressure compartment 32 is controlled by means of a ball valve 34 which is adapted to be selectively engaged with and disengaged from its valve seat by the temperature sensing device 26. The ball valve 34 is connected to a valve stem 36 which is provided at its upper end with an exhaust valve seat 38. The valve seat 38 communicates with the control pressure compartment 32 by means of the passage 40 through the valve stem 36. A ball valve 42 cooperates with the valve seat to control the exhaust of the compartment 32 to atmosphere.

When the valve stem 36 is forced downwardly so as to unseat the ball valve 34, the supply pressure is communicated to the control pressure compartment 32 so as to increase the pressure therein. Conversely, when the force on the ball valve 42 is decreased, the control pressure forces the ball valve 42 from its seat so that the pressure in the compartment 32 is exhausted to atmosphere. The changes in pressure in the compartment 32 are communicated to the control device for actuation of the same in accordance therewith. As mentioned previously, for a more complete description of the construction and operation of the relay 24, reference is made to the aforementioned copending application.

The temperature sensing deivce embodying the invention includes a bimetallic element or blade 44 composed of the metallic laminations 45a and 45b. For purposes of convenience it will be assumed that the lamination 45a has a coefficient of expansion greater than that of lamination 45b. Such assumption, however, is merely by way of example, and the relationship could be reversed or selected to be of any desired magnitude. In the drawings the bimetallic element is shown as a straight blade. It is to be understood that such is merely by way of example in that the element may be curved even to the extent of being a flat spiral.

The element 44 is supported at its end 46 by means of a post 48 projecting from the housing 12. The blade 44 engages at the intermediate point 49 the ball valve 42 for driving the same and the stem 36 and ball valve 34 in accordance with the temperature sensed by the blade 44. The blade 44 is provided at the end 50 with a ball coupling member 52. The coupling member 52 is adapted to selectively engage the post assembly 54.

The post assembly is in turn driven in and out of engagement with the end of the bimetal by the pneumatic drive assembly 56. A moment is imposed upon the blade 44 by means of the preload assembly 58 for establishing an equilibrium temperature for the relay assembly 10.

The post assembly 54 includes the adjustable post member 60 which is provided with the aperture 62 for receiving the ball coupling member 52. It will be noted that in the preferred embodiment the aperture 62 is sufficiently large that it will engage at least a part of the ball member 52 even when the bimetal is deflected to either of its extreme positions. As the post assembly is forced farther to the left toward its fully engaged position, the ball member 52 cams over the edge of the aperture 62 until it is fully received therein. As a result, the end of the bimetal secured to the ball member 52 is always forced into the same position regardless of its position at the time the post assembly is actuated into engagement therewith.

The post 60 is secured to the fixed post member 64 which is secured to the housing 12 by means of the leaf spring 66. The leaf spring 66 may be mounted in any suitable fashion, such as by means of the screws 68 and the rivets 70. The leaf spring 66 provides a simple hinge construction for attaching the post assembly 54 to the housing 12.

The fixed post member 64 and the adjustable post member 60 are both provided with apertures 70 and 72. An adjusting screw 74 is received in apertures 70 and 72 and cooperates therewith for positioning of one post with respect to the other.

The adjustable post member 60 is secured to the fixed post member 64 by means of the rivets 76. The rivets 76 extend through the slot 78 in the post member 60 so as to permit limited movement of the latter with respect to fixed post member 64. A spring washer 80 is disposed between the heads of the rivets 76 and the adjustable post member 60 for biasing the latter into frictional engagement with the fixed post member 64. As a result of this construction, the adjustable post member 60 may be precisely adjusted in a vertical direction by means of the screw 74 so that the aperture 62 is aligned with the ball coupling member 52.

The post assembly 54 is biased into engagement with the bimetal 44 by the coil spring 82. The spring 82 is secured at one end to the housing 12 and the other end to the shoulder 84 on the fixed post member 64.

The pneumatic drive assembly for disengaging the selective post assembly 54 from the blade 44 will now be described. The drive assembly 56 comprises a valve body 86 which is mounted within the bore 88 of the housing 12. The bore 88 is connected to the supply pressure by means of the passage 90 which opens at one end of the valve body 86. The valve body is provided with the bore 92 for receiving the valve assembly 94. The bore 92 communicates with the pressure sensitive diaphragm assembly 96 by means of the passages 98, 100 and 102. The passage 98 communicates with atmosphere through the bleed valve 99.

The valve assembly 94 includes the annular diaphragm 104 which is secured adjacent its outer periphery between the upper end of the valve body 86 and the shoulder 106 on the housing 12. A valve body 108 is secured to the inner periphery of the diaphragm 104 by means of the lug 110. The valve body 108 receives the ball valve 112 which is adapted to engage the upper end of the passage 98 for controlling the communication of the supply pressure therethrough to the diaphragm assembly 96. The valve assembly 94 is biased into seating engagement by means of a coil spring 114 which is disposed between the lug 110 and the adjusting cap 116. The spring 114 forces the ball valve 112 into seating engagement until a supply pressure of a predetermined magnitude is exerted upon the diaphragm 104 as will be explained more fully later on. When the ball valve 112 is lifted from its seat, the supply pressure is communicated to the pressure sensitive diaphragm assembly 96.

The diaphragm assembly 96 includes the diaphragm 118 which cooperates with the housing 12 to define the compartment 120. The diaphragm 118 is secured in place at its outer periphery by means of the ring member 122 which may be fastened by any suitable means such as staking, threads, or the like. The compartment 120 is open to the passage 102, as explained previously. A post member 124 is fixed at one end to the diaphragm 118. The other end of the post 124 is provided with the lug 126 which is received in the aperture 128 in the fixed post member 64.

The operation of the drive assembly 56 to disengage the post assembly 54 from the brake 44 will now be described. It will be noted that, generally, in the operation of air conditioning systems which selectively provide both heating and cooling, a different supply pressure is utilized for the different phases of operation. For example, during the time the air conditioning unit is used to heat the ambient atmosphere, the supply pressure will be at some suitable level which, for purposes of describing the invention, will be assumed as 22 p.s.i. On the other hand, when the air conditioning unit is utilized to cool the atmosphere, it will be assumed the supply pressure will generally be at some lower value, such as 18 p.s.i. The practice of utilizing two different supply pressures is conventional and is normally effected by a manual change in the system at the time of switch-over from heating to cooling and vice versa.

The spring 114 and diaphragm 104 are constructed so that upon the sensing of the higher pressure, the valve body 108 and ball valve 112 are lifted from their seated position so that the supply pressure is communicated to the compartment 120. The pressure forces the diaphragm 118 to the right and in turn, the post 124 so as to disengage the post assembly 154 from the coupling member 52. As long as the relay assembly is operated at the higher of the two pressures, the supply pressure is sensed by the diaphragm 118 so that the blade 44 is supported only at the end 46.

When the air conditioning system is switched to its cooling cycle, the lower of the two supply pressures is directed to the drive assembly 56. The force generated by the lower supply pressure is insufficient to lift the valve body 108 from its seated position against the force on the coil spring 114. The pressure within the passages 98, 100, 102, and in turn the compartment 120, is then at atmospheric as a result of the bleed valve 99. As a result, the post assembly 54 is biased into engagement with the coupling member 52 by the coil spring 82 so that the blade 44 is supported at both ends.

The preload assembly 58 includes the yoke 130 which is rectangular in cross section, as can be seen in FIGURE 5. The yoke 130 includes the side members 132 and the upper and lower cross members 134 and 136. The upper cross member 34 is secured to the end 50 of the blade 44 by any suitable means and provides a means for mounting the ball coupling member 52. The lower cross member 136 is secured to the channel member 138 by some suitable means such as welding.

The channel member 138 is provided with the aperture 140 which receives the shaft 142 of the knob 144. The knob 144 is provided with the threaded stem 146 which engages the link 148. The link 148 is of a polygonal cross section and extends through the slot 150 in the channel member 138 and as a result of its cross sectional shape is prevented from turning therein.

The link 148 and the coil spring 152 are coupled by means of the aperture 154 and the hook end 156. The coil spring 152 is secured at its other end to the hook 158 which is attached to the post 160 on the housing 12.

The tension of the spring 152 is imparted in the form of a moment to the bimetal by means of the yoke 130. By turning the knob 144, it is possible to vary the tension of the coil spring 152.

When the end 50 of the blade 44 is unsupported, the spring pressure imposes a moment on the blade 44 so as to force the end 50 and substantially all portions intermediate it and the end 46 downwardly. However, if the end 50 is supported, the spring force imposes a moment on said blade 46 so that substantially all portions intermediate the ends 46 and 50 are bowed upwardly, since the end 50 cannot move downwardly. In this way it is possible to establish an equilibrium temperature in the sensing device 26 whether the blade 44 is direct acting or reverse acting.

The pre-load assembly 58 may be provided with an external means (not shown) for adjusting the equilibrium temperature which is attached to the hook 158. This means can take the form of a calibrated knob mounted on the air conditioning unit, which could be adjusted externally thereof. The calibrated knob would in turn be attached to suitable mechanical means for moving the hook member 158 to the right or left for varying the preload on the spring 152. The pre-load assembly 58 and particularly the calibrated knob may be constructed so that the magnitude of the bias on the bi-metallic element is the same for a given unit of rotation of the knob whether the blade is direct or reverse acting. In this way the same calibrations may be utilized for both the heating and cooling operations.

The temperature sensing device embodying the invention and the relay assembly with which it may be used will now be described as to their operation, with reference to FIGURES 2 and 3. In FIGURE 2, the post assembly is shown as being disengaged from the end 50 and coupling member 52. As stated previously, the blade 44, when at equilibrium, is bowed slightly downwardly by the moment imposed by the preload assembly 58. In accordance with the assumed construction of the bimetallic blade 44, when it senses an increase in temperature, it is caused to bow further downwardly, as indicated by the dot-dash line, 170. Conversely, when the bimetal senses a decrease in temperature, it is caused to bow upwardly, as indicated by the dotted line 172. It will be understood that the lines 170 and 172 are exaggerated for purposes of illustration. As stated previously, the blade 44 engages the relay 24 at a point 49 intermediate its ends. When the bimetal is bowed downwardly, the point 49 of engagement, moves in the direction corresponding to the movement of the end 50 and, accordingly, drives the relay 24 in like directions. For purposes of reference, such movement will be considered relative to the fixed end 46. Thus, an increase in temperature will cause the point 49 to move downwardly, and a decrease in temperature will cause the point 49 to move upwardly, both relative to the fixed end 46.

When the blade is supported at both ends as shown in FIGURE 3, the end 50 is restrained against linear movement in the direction of deflection. It is recognized that the end 50 may move linearly toward and away from the end 46, and that the ball member 52 may rotate. It should be understood that the construction of the supports at the ends of the blade are merely by way of example and that other arrangements may be used. Thus, when the blade 44 senses an increase in temperature, it is caused to bow upwardly to satisfy the higher co-efficient of expansion of the lamination 45a, as indicated by the dotted line 174. This means that the point 49 is likewise moved upwardly, or just the opposite in direction to its movement, when the blade is supported at only one end. Conversely, if the blade, when supported at both ends, senses a decrease in temperature, it will be caused to be bowed downwardly, as indicated by the dot-dash line 176, to satisfy the difference in co-efficients of expansion between the laminations 45a and 45b so that the point of contact 49 likewise moves downwardly. It can now be seen that the movement of the point 49 as the result of the decrease in temperature is opposite when the blade is shown as supported at both ends from that where it is supported at only one end. It will be apparent that the movements of the ball valves 34 and 42 will correspond with those of the point 49. If the point 49 moves up, the ball valve 42 will be unseated so that the control pressure is decreased. Conversely, if the point 49 moves down, the ball valve 34 will be unseated so that the control pressure is increased.

For purposes of illustration it will be assumed that an increase in control pressure tends to close the control valve and that a decrease in control pressure will tend to open the same. In accordance with the assumptions made as to the specific construction of the bimetal 44, when it is supported at both ends, an increase in temperature will cause a decrease in control pressure as a result of the upward movement of point 49 so that the control valve will be further opened and thus admit a greater quantity of cooling medium to the heat exchanger. Conversely, upon sensing a decrease in temperature, the control pressure will be likewise increased as a result of downward movement of point 49, whereby the control valve is partially closed so as to throttle or diminish the quantity of cooling fluid admitted to the exchanger. This type of operation is considered as direct acting since the quantity of the control fluid is directly related to the variations in temperature sensed by the bimetal.

On the other hand, when the blade is supported only at one end, an increase in temperature will cause an increase in control pressure as a result of the downward movement of point 49, whereby the control valve is at least partially closed. Therefore, the heating medium supplied to the heat exchanger is diminished. If the bimetal blade 44 senses a decrease in temperature, the control pressure is decreased as a result of the upward movement of point 49, whereby the control valve is permitted to open so as to permit a greater quantity of heating medium to the heat exchanger. In this type of operation of the quantity of the heating medium is inversely related to the temperature sensed by the bimetal 44. This type of operation is commonly called reverse acting.

It can now be seen that the subject invention provides a means by which a single bimetallic element may be utilized for both direct and reverse acting type of operations. The conversion from direct to reverse acting and vice versa may be effected automatically and may be coupled to the pneumatic system utilized for controlling the flow of the heat exchange medium.

It will be understood, however, as pointed out previously, that the subject invention is not limited to use in air conditioning systems, but may be utilized wherever temperatures are to be controlled and where reverse and direct acting operations are needed. Furthermore, it is not limited to pneumatic systems, since the post assembly may be driven by any suitable means. For example, the bimetallic element may be used in an electrically operated system whereby the driving force for disengaging the post assembly from the blade 44 is effected by some suitable electrical means such as a solenoid. Other types of driving means, such as mechanical, may also be used.

In FIGURE 6 there is shown a modification of the temperature sensing device embodying the invention in which the selective post assembly is driven by a solenoid. In this modification like parts are designated by like numbers. The modification 200 includes a bimetallic blade 44 which is provided with a ball coupling member 52 adapted to selectively engage the post assembly 54 as previously described. The bimetallic element 44 is provided with an electrical contact 202 intermediate its ends. The contact 202 is adapted to engage the contact 204 which is connected to some device adapted to be selectively controlled by electrical energy. For purposes of simplicity, the system as shown in the modification is a simple on-off arrangement although it is apparent that proportional systems are equally applicable.

The selective post assembly 54 is biased into its open position (as indicated by the dotted lines) by the compression spring 206. When it is desired to engage the assembly 54 at the coupling element 52 the solenoid 208 is electrically energized. The solenoid 208 comprises a coil 210 and a plunger 212 which is connected to the post assembly 54 by means of the stem 214. The stem 214 extends through the aperture 216 and drivingly engages the post assembly 54 by means of the lug 218. When the solenoid is energized by connecting it with a suitable source of electrical energy, the plunger is attracted toward the left so that the post assembly 54 engages the ball coupling member 52.

The operation of the bimetallic element 44 is essentially the same whether the post assembly is driven electrically or pneumatically or by any other suitable means. The energization of the solenoid may be effected by any suitable switching device, including those that are manually operated, which is actuated at the time the system is switched from heating to cooling and vice versa.

It will also be noted that the relationship of the elements 45a and 45b may be reversed. Specifically, the element 45b may be constructed of metal having a higher coefficient of expansion than that used in the 45a. When this happens, the relationship will be reversed so that when the bimetal is supported at both ends, it will provide a reverse acting characteristic, and when supported at only one end, will provide a direct acting characteristic.

Furthermore, relays and control valves having characteristics just the opposite of those described, may be used. In this manner the bimetal could be direct acting when supported at only end and reverse acting when supported at both ends.

It will be understood that the embodiments and terminology used in the description of the invention are merely by way of example and are not to be considered limitations. It will be apparent to those skilled in the art that changes may be made within the scope of the claims without departing from the spirit of the invention.

It is claimed:

1. In a pneumatic relay assembly adapted to control the supply of the heating and cooling medium in an air conditioning system in accordance with the temperature of the ambient atmosphere, the pneumatic relay assembly including a relay which is adapted to generate a pneumatic signal proportional to an input signal, the relay being connected to a first supply pressure when the system is heating and to a second supply pressure when the system is heating and to a second supply pressure when the system is cooling, one of the supply pressures being higher than the other, the combination comprising a bimetallic element for sensing the temperature of the ambient atmosphere and adapted to deflect from a reference configuration in accordance with variations in temperature, said bimetallic element having first and second ends and engaging the relay at a point intermediate said ends for imposing thereon an input signal of a magnitude commensurate with the temperature of the ambient atmosphere, first means for mounting said bimetallic element adjacent said first end to prevent movement of said first end due to changes in temperature, second means adapted to selectively engage said bimetallic element at a point spaced from said first means for restraining said point of engagement against deflection when in engagement therewith whereby when said second means is disengaged from said bimetallic element said intermediate point is caused to move in a predetermined direction relative to said first end by a predetermined change in temperature and when said second means is engaged with said bimetallic element said intermediate point is caused to move relative to said first end in a direction other than said predetermined direction by said predetermined change in temperature, third means sensing the supply pressure connected to said relay and being driven by a higher of the first and second supply pressures to disengage said second means from said bimetallic element, spring means biasing said second means into engagement with said bimetallic element when the lower of the supply pressure is communicated to the relay, and means for imposing a moment on said bimetallic element to establish an equilibrium temperature for said air conditioning system.

2. The invention according to claim 1 in which said means for imposing a moment comprises a lever secured at one end to said bimetallic element adjacent said second end and angularly depending therefrom, a spring means biasing said lever, generally toward said first end whereby said bimetallic element is bowed when said second mounting means is disengaged from said bimetallic element so that said intermediate point is caused to move in a predetermined direction and when said second mounting means is engaged with said bimetallic element said intermediate point is caused to move in a direction opposite to said predetermined direction.

3. The invention according to claim 1 in which said third means comprises a valve member, a spring means for biasing said valve member toward its closed position, means sensing said supply pressure and opening said valve member when sensing the higher of said first and second supply pressures, movable wall means communicating with said supply pressure when said valve member is open, and mechanical means connecting said movable wall means and said second mounting means, said movable wall means driving said second mounting means out of engagement with said bimetallic element when said supply pressure is communicated to said movable wall means.

4. A method for selectively obtaining both direct and inverse signals from a single temperature sensitive bimetallic blade adapted to deflect from a reference configuration in accordance with changes in temperature comprising restraining one end of said bimetallic blade against linear movement in the direction of deflection, and selectively restraining the other end of said bimetallic blade against linear movement in the direction of deflection, whereby when said other end is restrained, a point intermediate said ends is caused to move in a predetermined direction relative to said one end by a predetermined change in temperature, and when said other end is not restrained said intermediate point is caused to move in a direction opposite to said predetermined direction relative to said one end by said predetermined change in temperature.

5. In connection with an air conditioning system adapted to selectively operate as a heating unit and as a cooling unit, a method for selectively obtaining both direct and inverse signals from a single bimetallic blade adapted to deflect from a reference configuration in accordance with changes in temperature comprising restraining one end of said bimetallic blade against linear movement in the direction of deflection, restraining the other end of said bimetallic blade against linear movement in the direction of deflection when said air conditioning system is operating as either a heating unit or a cooling unit, and permitting the other end of said bimetallic blade to move in the direction of deflection when said air conditioning system is operating as the other of said units, whereby when said other end is restrained, a point intermediate said ends is caused to move in a predetermined direction relative to said one end by a predetermined change in temperature, and when said other end is permitted to move said intermediate point is caused to move in a direction opposite to said predetermined direction relative to said one end by said predetermined change in temperature.

6. A condition sensing device comprising a temperature sensitive bi-metallic element having first and second ends in which said second end when unrestrained is adapted to deflect in a first direction when said bi-metallic element senses an increase in temperature and in an opposite direction when said bi-metallic element senses a decrease in temperature, said bi-metallic element adapted to engage signal receiving means at a point intermediate its ends, a first mounting means supporting said bi-metallic element adjacent its first end for restraining said first end against movement due to changes in the temperature sensed by said bimetallic element, a second mounting means adapted to selectively engage said second end for fixing said second end against movement in both said first and opposite directions whereby when said second mounting means is disengaged from said bimetallic element said intermediate point is caused to move in said first direction by an increase in temperature and in said opposite direction by a decrease in temperature and when said second mounting means is engaged with said bimetallic element said intermediate point is caused to move in said opposite direction by an increase in temperature and in said opposite direction by a decrease in temperature.

7. A condition sensing device comprising a temperature sensitive bi-metallic element adapted to deflect from a reference configuration in accordance with changes in temperature, first means engaging said bi-metallic element at a first point for restraining the same against movement, second means for selectively engaging said bi-metallic element at a second point spaced from said first point, and third means for biasing said bi-metallic element so that a point intermediate said first and second points is biased in a first direction when said second means engages said bi-metallic element and so that said intermediate point is biased in an opposite direction when said second means is disengaged from said bi-metallic element.

8. A condition sensing device comprising a temperature sensitive bi-metallic element adapted to deflect from a reference configuration in accordance with changes in temperature, first means engaging said bi-metallic element at a first point for restraining the same against movement, second means for selectively engaging said bi-metallic element at a second point spaced from said first point, and third means for imposing a turning moment on said bi-metallic element so that a point intermediate said first and second points is biased in a first direction when said second means engages said bi-metallic element and so that said intermediate point is biased in an opposite direction when said second means is disengaged from said bi-metallic element.

9. A condition sensing device comprising a temperature sensitive bi-metallic element adapted to deflect from a reference configuration in accordance with changes in temperature, first means engaging said bi-metallic element at a first end for restraining said first end against movement, second means for selectively engaging said bi-metallic element at its other end, said other end being free to move when said second element is disengaged therefrom and restrained from movement in the direction of deflection when said second means is engaged therewith, and third means for imposing a turning moment on said bi-metallic element so that portions intermediate said ends are biased in a first direction when said second means engages said other end and so that said portions are biased in an opposite direction when said second means is disengaged from said other end.

10. The invention as defined in claim 9 in which said third means is further characterized as a lever secured adjacent one end to said bi-metallic element, a spring means secured to said lever adjacent to its other end, said spring means exerting a force on said lever whereby said lever imposes said moment on said bi-metallic element.

11. The invention as defined in claim 10 in which said third means is further characterized as being constructed so that the magnitude of the moment imposed on said bi-metallic element by a given force exerted on said lever is substantially the same when said second element is both disengaged from and engaged with said bi-metallic element.

12. In a relay assembly having a relay adapted to generate a control signal proportionate to an input signal, the combination comprising a bimetallic element adapted to deflect from a reference configuration in accordance with changes in temperature, said bimetallic element having first and second ends and engaging the relay at a point intermediate said ends for imposing a signal thereon, first means for mounting said bimetallic element adjacent said first end to prevent movement thereof due to changes in the temperature, and second means adapted to selectively engage said bimetallic element adjacent said second end for fixing said second end against deflection when in engagement therewith whereby when said second means is disengaged from said bimetallic element said intermediate point is caused to move in a predetermined direction relative to said first end by a predetermined change in temperature and when said second means is engaged with said bimetallic element said intermediate point is caused to move relative to said first end in a direction other than said predetermined direction by said predetermined change in temperature.

13. In a pneumatic relay system having a relay adapted to generate a pneumatic signal proportional to an input signal, the relay being connected to a source of supply pressure for generating said pneumatic signal, the combination comprisng a bimetallic element adapted to deflect from a reference configuration in accordance with variations in temperature, said bimetallic element having first and second ends and adapted to engage the relay at a point intermediate said ends for imposing an input signal thereon, first means for mounting said bimetallic element adjacent said first end to prevent movement thereof due to changes in temperature, second means adapted to selectively engage said bimetallic element adjacent said second end for fixing said second end against deflection when in engagement therewith whereby when said second means is disengaged from said bimetallic element said intermediate point is caused to move a predetermined direction relative to said first end by a predetermined change in temperature and when said second means is engaged with said bimetallic element said intermediate point is caused to move relative to said first end in a direction other than said predetermined direction by said predetermined change in temperature, and third means sensing the supply pressure for selectively engaging and disengaging said second means from said bimetallic element.

14. In a pneumatic relay assembly having a relay adapted to generate a pneumatic signal proportionate to an input signal, the relay being connected to a source of supply pressure for generating the pneumatic signal, the combination comprising a bimetallic element adapted to deflect from a reference configuration in accordance with variations in temperatures, said bimetallic element having first and second ends and engaging said relay at a point intermediate said ends for imposing an input signal thereon, first means for mounting said bimetallic element adjacent said first end to prevent movement thereof, due to changes in temperature, second means adapted to selectively engage said bimetallic element adjacent said second end for fixing said second end against deflection when in engagement therewith whereby when said second means is disengaged from said bimetallic element said intermediate point is caused to move in a predetermined direction relative to said first end by a predetermined change in temperature and when said second means is engaged with said bimetallic element said intermediate point is caused to move relative to said first end in a direction other than said predetermined direction by said predetermined change in temperature, third means sensing said supply pressure to selectively disengage said second means from said bimetallic element, and spring means biasing said second means toward engagement with said bimetallic element.

15. In a pneumatic relay assembly having a relay adapted to generate a pneumatic signal proportionate to an input signal, the relay being selectively connected to a first supply pressure and a second supply pressure in which the former is greater than the latter the combination comprising a bimetallic element adapted to deflect from a reference configuration in accordance with variations in temperature, said bimetallic element having first and second ends and engaging the relay at a point intermediate said ends for imposing an input signal thereon, first means for mounting said bimetallic element adjacent said first end to prevent movement thereof due to changes in temperature, second means adapted to selectively engage said bimetallic element adjacent said second end for fixing said second end against deflection when in engagement therewith whereby when said second means is disengaged from said bimetallic element said intermediate point is caused to move in a predetermined direction relative to said first end by a predetermined change in temperature and when said second means is engaged with said bimetallic element said intermediate point is caused to move relative to said first end in a direction other than said predetermined direction by said predetermined change in temperature, third means sensing the supply pressure connected to said relay and being driven by the first supply pressure when the same is communicated to the relay to disengage said second means from said bimetallic element, and spring means biasing said second means toward engagement with said bimetallic element.

16. In a pneumatic relay assembly adapted to control the supply of the heating and cooling medium in an air conditioning system in accordance with the temperature of the ambient atmosphere, the pneumatic relay assembly including a relay which is adapted to generate a pneumatic signal proportionate to an input signal, the relay being connected to a first supply pressure when the system is heating and to a second supply pressure when the system is cooling, one of the supply pressures being greater than the other, the combination comprising a bimetallic element for sensing the temperature of the ambient atmosphere and adapted to deflect from a reference configuration in accordance with variations in temperature, said bimetallic element having first and second ends and engaging the relay at a point intermediate said ends for imposing thereon an input signal of a magnitude commensurate with the temperature of the ambient atmosphere, first means for mounting said bimetallic element adjacent said first end and to prevent movement of said first end due to changes in the temperature, second means adapted to selectively engage said bimetallic element adjacent said second end for restraining said second and against deflection when in engagement therewith whereby when said second means is disengaged from said bimetallic element said intermediate point is caused to move in a predetermined direction relative to said first end by a predetermined change in temperature and when said second means is engaged with said bimetallic element, said intermediate point is caused to move relative to said first end in a direction other than said predetermined direction by said predetermined change in temperature, third means sensing the supply pressure connected to the relay and being driven by the higher of the first and second supply pressures when the higher pressure is communicated to the relay to disengage said second means from said bimetallic element, and spring means imposing a biasing force on said second means greater than the force imposed by the lower of the supply pressures whereby said second means is biased into engagement with said bimetallic element when the lower of the supply pressures is communicated to the relay.

17. The invention as defined in claim 16 in which said bimetallic element is further characterized as including a ball member adjacent said second end, said second means including a socket adapted to receive said ball member when said second means engages said bimetallic element.

18. A method for selectively obtaining both direct and inverse signals from a single temperature sensitive bimetallic blade adapted to deflect from a reference configuration in accordance with changes in temperature, comprising fixedly mounting one end of said bimetallic blade so that said blade when otherwise unrestrained will deflect in a first direction upon an increase in temperature and will deflect in an opposite direction upon a decrease in temperature, and selectively restraining the other end of said bimetallic blade from movement in either said first or opposite directions, and permitting an intermediate point to move in accordance with changes in temperature, whereby when said other end is restrained a point intermediate said ends is caused to move in a predetermined direction relative to said one end by a predetermined change in temperature, and when said other end is not restrained said intermediate point is caused to move in a direction opposite to said predetermined direction relative to said one end by said predetermined change in temperature.

19. A condition sensing device comprising a temperature sensitive blade adapted to deflect from a reference configuration in accordance with changes in temperature, said blade having first, second and third longitudinally spaced points, first means for mounting said bimetallic element at said first point to prevent movement of said first point due to changes in temperature sensed by said blade, and second means for selectively engaging said blade at said second point, for preventing movement thereof when engaged therewith, said third point on said blade moving in a first direction when said blade senses an increase in temperature and said second means is disengaged from said second point, said third point moving in a direction opposite to said first direction when said blade senses an increase in temperature and said second means is engaged with said second point.

20. A condition sensing device comprising a temperature sensitive bimetallic blade adapted to deflect from a reference configuration in accordance with changes in temperature and having first, second and third longitudinally spaced points, first means for mounting said blade adjacent said first point for preventing movement of said first point due to changes in the temperature, second means for selectively engaging said blade at said second point for preventing movement thereof when engaged therewith, said third point moving in a predetermined direction when said blade senses a predetermined change in temperature and said second means is disengaged from said second point, said third point moving in a direction opposite to said predetermined direction when said blade senses a predetermined change in temperature and said second means is engaged with said second point, and third means for selectively moving said second means in and out of engagement with said blade, said blade being adapted to engage a signal receiving means at said third point.

21. The invention as defined in claim 20 in which said third means is electrically operated.

22. The invention as defined in claim 20 in which said third means is pneumtaically operated.

References Cited by the Examiner

UNITED STATES PATENTS

| | | | |
|---|---|---|---|
| 2,000,739 | 5/35 | Bristol et al. | 236—82 |
| 2,070,108 | 2/37 | Bargeboer | 236—1 |
| 2,140,147 | 12/38 | Vroom | 73—363.5 |
| 2,332,518 | 10/43 | Koci | 200—139 X |
| 2,506,503 | 5/50 | Hilgert | 236—86 |
| 2,511,340 | 6/50 | Joesting | 236—1 |
| 2,668,014 | 2/54 | Lund | 236—87 |

EDWARD J. MICHAEL, *Primary Examiner.*

PERCY L. PATRICK, *Examiner.*

UNITED STATES PATENT OFFICE
CERTIFICATE OF CORRECTION

Patent No. 3,181,788            May 4, 1965

Robert J. Norman

It is hereby certified that error appears in the above numbered patent requiring correction and that the said Letters Patent should read as corrected below.

Column 3, line 67, for "deivce" read -- device --; column 7, line 46, strike out "of", second occurrence; column 8, lines 59 and 60, strike out "heating and to a second supply pressure when the system is"; column 12, line 57, for "and" read -- end --.

Signed and sealed this 28th day of September 1965.

(SEAL)
Attest:

ERNEST W. SWIDER
Attesting Officer

EDWARD J. BRENNER
Commissioner of Patents